Patented Sept. 21, 1926.

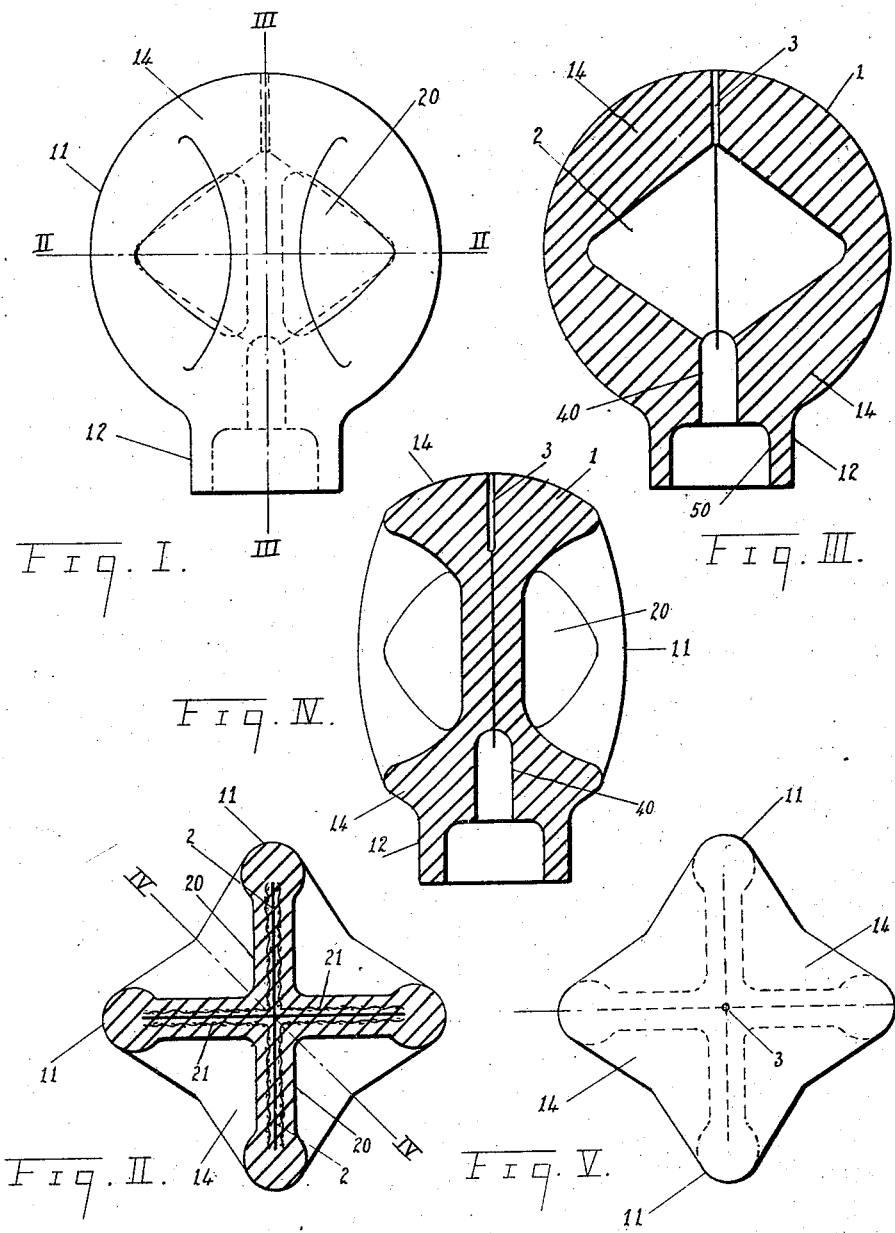

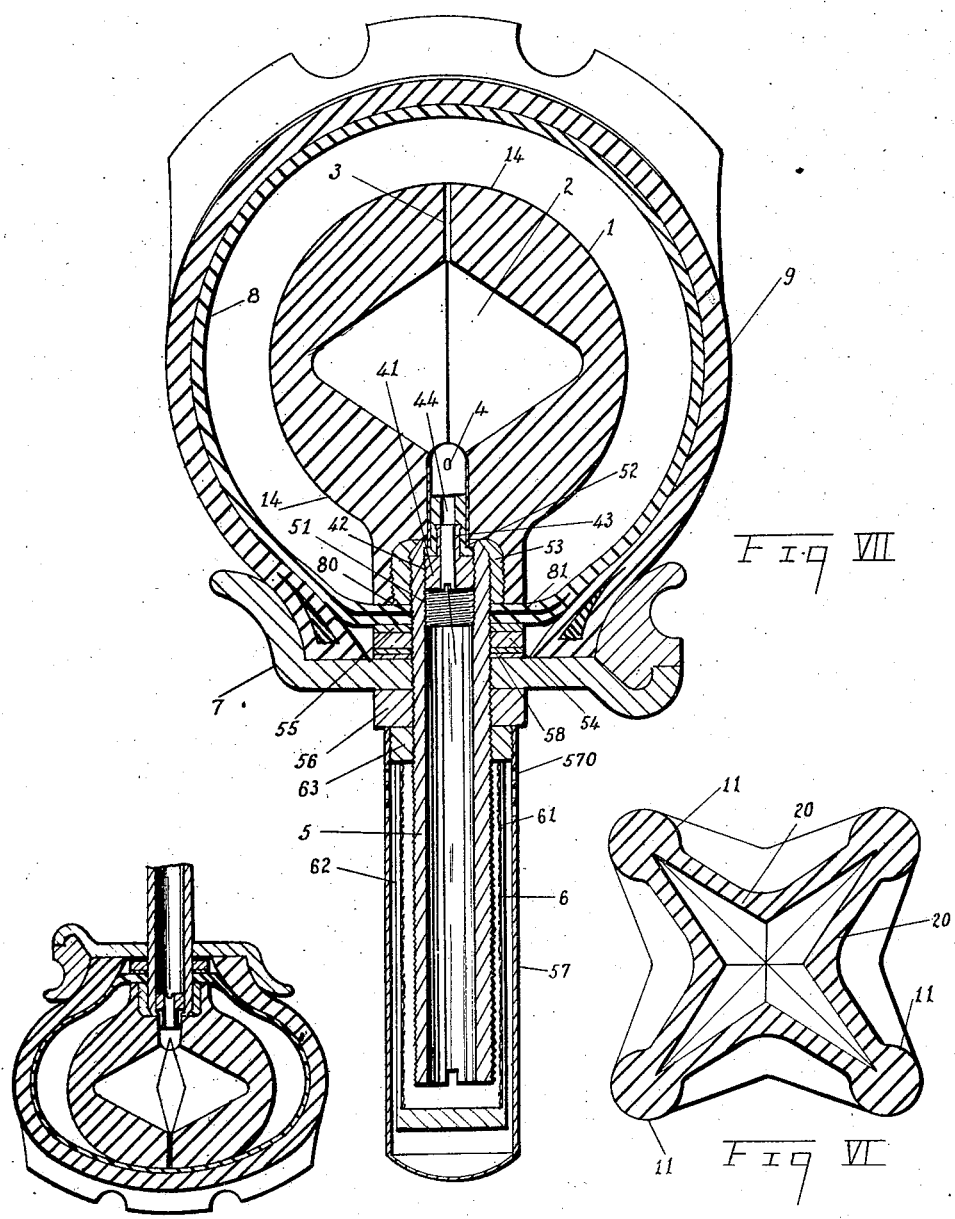

1,600,934

UNITED STATES PATENT OFFICE.

WILLIAM GORDON CUMMING, OF MONTREAL, QUEBEC, CANADA.

TIRE-INFLATING MECHANISM.

Application filed August 24, 1925. Serial No. 52,071.

This invention relates to the inflation of pneumatic tires and more particularly to providing means within the tube to inflate it.

It has for its object not only to maintain a tire at the proper pressure but also to adjust the tire pressure to the load.

It has the further object of providing means whereby a pneumatic tire with a slow leak or small puncture may be kept sufficiently inflated to operate satisfactorily.

In my application Serial Number 752,749 one form of a suction pump is shown and described.

The improved form which is described hereafter consists of a pump entirely of resilient material such as rubber and is of a greatly improved design with many advantages.

By eliminating metal toggles and changing the position and form of the valves a simpler, cheaper and more efficient pump is provided, and any damage to a collapsed tire is obviated.

It consists briefly of a suction pump of resilient material situated within the inflated tube, which produces a vacuum when operated by the pressure of the tread of the tire, draws air into the pump, and when the pressure of the tread is removed, forces this air out of the pump into the surrounding tube.

It is so adjusted that it only operates when the air pressure within the tube falls below the normal pressure required, or in the event of overload.

My invention is of simple and cheap construction and is mounted on an inlet tube passing through the wheel rim.

By means of adjusting the position of the pump in relation to the tread, it will only function when the inflation of the tube falls below the designed degree for normal operation. Not only will it maintain a tube fully inflated to the desired pressure under ordinary conditions but in the case of small punctures or a slow leak it will keep the tire in an effective condition and prevent its collapse and injury which might result therefrom.

Reference is made to the accompanying drawings in which:—

Fig. 1 is a side view of the pump.

Fig. 2 is a horizontal cross section on the line 2—2 of Fig. 1.

Fig. 3 is a vertical cross section on the line 3—3 of Fig. 1.

Fig. 4 is a vertical cross section on the line 4—4 of Fig. 2.

Fig. 5 is a top view of the pump.

Fig. 6 is a horizontal cross section similar to that of Fig. 2 but showing the effect of compression on the walls of the pump, and the cavity created therein.

Fig. 7 shows a sectional view of the inner tube, casing and pump, installed in operative position with inlet tube and filter.

Fig. 8 shows a sectional view of the inner tube, casing and pump under compression.

In the form described hereafter.

The pump consists of a spherical shaped rubber body 1, having slits 2, radiating from its vertical axis.

The walls 20, of the slits 2, are comparatively thin and are preferably made with a layer of woven fabric while the edges of the slits are encased in rings 11, which widen to unite and form substantial cushions 14, at the top and bottom.

The bottom is shaped to form a base 12, to fit in the groove formed by the sides of the casing or cover 9.

An axial aperture 3, runs through the top from the slits 3.

An inlet valve aperture 40, passes through the bottom portion axially, and a cup 50, to fit on the end 53, of the inlet tube stem 5, extends into the base 12.

The rings 11, are preferably weakened centrally to give increased resiliency, in the section shown in Figs. 2 and 6.

The inlet stem 5, is threaded externally and internally at 51, at one end, and has an interior annular ring 52.

The inlet valve 4, consists of a metal tube 41, threaded at 42, to mesh with the interior threading 51, of the stem 5 and has a projecting sleeve 43, on which the rubber valve tip 44, is mounted. The end of the valve tube 41, is notched at 46, to enable the valve 4, to be removed by means of a screw driver.

The end of the inlet stem 5, has a thimble 53, which may be integral with it. This thimble fits into the cup 50, and supports the pump body 1.

The inlet valve stem 5, passes through an aperture 80, in the inner tube 8, and the usual valve pad 81, surrounds the aperture 80.

A nut 54, and a washer 55, seal the aperture 80, in the inner tube 8. The inlet stem then passes through the rim 7, of the wheel.

A lock nut 56, secures the stem 5, to the rim 7.

Surrounding the stem 5, beyond the lock nut 56, is a filter 6.

The filter 6, consists of a perforated tube 61, covered with a chamois envelope 62.

The base 63, of the filter 6, is internally threaded to screw on the stem 5, and externally threaded to hold the cap 57.

A series of perforations 570, near the base of the cap 57, allows the air to enter the cap 57.

The filter 6, may be secured within the inlet valve stem 5, in place of the arrangement described.

In order to vary the position of the pump, shims 58, may be interposed between the nut 54, and the rim 7, surrounding the stem 5.

The operation of the device is as follows:—

When the pump 1, is firmly mounted on the stem as shown in Fig. 7, the top 14, surrounding the aperture 3, is normally some distance from the inner tube 8.

As the pump is not intended to inflate an empty tube but rather to maintain its inflation, the tube should be pumped up in the usual way through the inlet tube 5.

When the casing 9, is flattened sufficiently by the weight of the car, the inner tube 8, is pressed against the top of the pump and the inner tube acts as a valve and closes the aperture 3, and as long as compression lasts the air is prevented from passing out of the pump through the aperture 3. But as soon as the pressure is withdrawn the inner tube leaves the top of the pump, and the outlet 3, is free and open.

The effect of further pressure on the top of the pump is to extend outwardly the middle section shown in Fig. 2, causing the walls of the slits to separate and assume a shape shown in Fig. 6, and creating a vacuum within the pump.

The filtered air is drawn in through the stem and inlet valve and fills this area. This air is driven out of the pump through the inlet 3, as soon as the inner tube ceases to block the passage, by reason of the return of the displaced walls to their normal position.

Owing to the design of the pump and the solid nature of the rubber top and bottom cushions with their connecting rings, this come back takes place with great force and rapidity.

The displaced walls are also driven back to their normal closed postion by the air pressure within the inner tube, upon them. By means of the fabric in the walls, their movement is due to the stretching outwardly of the central portion of the rings and the displacement of the walls and not to stretching of the walls themselves.

As the depression of the tread can only operate the pump once on each revolution of the wheel, the action of the pump is intermittent. As soon as the pump has raised the pressure in the tube to the normal degree required for proper operation, it will cease to function as the depression of the tread will not reach the top of the pump.

Any drop in the air pressure in the tube taking place or increased flattening of the tread, from whatever cause, will permit the pump to function and quickly recover the loss, or readjust the pressure to the load.

As the pump has to be installed within the tube and secured to the inner end of the inlet tube, it is intended that the pump and its connections should form part of the inner tube and be supported therewith.

The sizes of the pump will be designed to correspond to the standard tire sizes, and the adjustment arranged to maintain the pressure suitable for the type of tire.

What I claim is:—

1. In a device of the class specified the combination of a wheel rim with a pneumatic tire thereon with a pump of resilient material within the inflatable tube of the tire adapted to be expanded and to form a vacuum within itself by the flattening of the tread of the tire, a valved inlet stem passing through the rim to the interior of the pump and supporting the pump, and a valved outlet from the pump to the surrounding interior of the inflatable tube of the tire.

2. In a device of the class specified the combination of a wheel rim and a pneumatic tire thereon with a pump of resilient material within the inflatable tube of the tire adapted to be expanded and to form a vacuum within itself by the flattening of the tread of the tire, comprising a rubber body having slits radiating from an axis radial to the wheel, having portions of the rubber between the walls of the slits cut away, a valved inlet stem passing through the rim to the interior of the pump and supporting the pump, and an outlet from the pump to the interior of the inflatable tube of the tire adapted to be closed by contact with the inner tube.

3. In a device of the class specified the combination of a wheel rim, a pneumatic tire thereon, and an inlet tube passing through the rim and the inner tube, with a pump of resilient material mounted on the end of the inlet tube and within the inner tube, adapted to be expanded and form a vacuum within itself and to inflate the inner tube by the flattening of the tire tread.

4. In a pneumatic tire suction pump adapted to be inserted within the inflatable tube, a spherical shaped form of resilient material having internal slits radiating from an axis, with a valved inlet passage to the slits at the supporting end of the axis and a valved outlet passage from the slits at the free end of the axis.

5. In a pneumatic tire a suction pump adapted to be inserted within the inflatable tube of spherical shaped form of resilient material having internal slits radiating from an axis and having fabric material in the walls of the slits, with a valved inlet passage to the slits at the supporting end of the axis and an outlet passage from the slits at the free end of the axis adapted to be closed by contact with the inner tube.

6. In a pneumatic tire a suction pump adapted to be inserted within the inflatable tube of spherical shaped form of resilient material, having internal slits radiating from an axis and having the material between the walls covering the slits cut away in the middle, such cut portions diminishing towards the poles of the sphere, with a valved inlet passage to the slits at the supporting end of the axis and an outlet passage from the slits at the free end of the axis adapted to be closed by contact with the inner tube.

7. A pump of resilient material adapted to be inserted within an inflatable tube comprising a spherical body with slits radiating from the axis, having thin walls to the slits, and solid polar parts which are axially perforated to provide valved inlet and outlet passages.

8. A pump of resilient material adapted to be inserted within an inflatable tube comprising a spherical shaped body, an axial valved inlet thereto, a series of slits radiating from the axis, having thin walls and solid edges which thicken towards the poles and an axial outlet adapted to be closed by contact with the tube.

WILLIAM GORDON CUMMING.